(12) United States Patent
Hwang et al.

(10) Patent No.: US 10,345,510 B2
(45) Date of Patent: Jul. 9, 2019

(54) LIQUID CRYSTAL DISPLAY

(71) Applicant: LG Display Co., Ltd., Seoul (KR)

(72) Inventors: Yongik Hwang, Paju-si (KR); Changhee Choi, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/857,451

(22) Filed: Dec. 28, 2017

(65) Prior Publication Data

US 2018/0188446 A1  Jul. 5, 2018

(30) Foreign Application Priority Data

Dec. 30, 2016 (KR) ......................... 10-2016-0183951

(51) Int. Cl.
*F21V 29/00* (2015.01)
*F21V 8/00* (2006.01)
*G02F 1/1333* (2006.01)
*G02F 1/1335* (2006.01)

(52) U.S. Cl.
CPC ......... *G02B 6/0085* (2013.01); *G02B 6/0088* (2013.01); *G02B 6/0093* (2013.01); *G02F 1/133308* (2013.01); *G02F 1/133602* (2013.01); *G02B 6/0051* (2013.01); *G02B 6/0053* (2013.01); *G02B 6/0055* (2013.01); *G02B 6/0083* (2013.01); *G02F 1/133615* (2013.01); *G02F 2001/133314* (2013.01); *G02F 2202/28* (2013.01)

(58) Field of Classification Search
CPC .. G02B 6/0051; G02B 6/0053; G02B 6/0055; G02B 6/0083; G02B 6/0085; G02B 6/0088; G02B 6/0093; G02F 1/133308; G02F 1/133602; G02F 2202/28
USPC ............................................ 362/294
See application file for complete search history.

(56) References Cited

U.S. PATENT DOCUMENTS

| | | | | |
|---|---|---|---|---|
| 8,400,582 B2* | 3/2013 | Kweon | ................ | G02B 6/0025 349/64 |
| 8,608,346 B2* | 12/2013 | Wang | ................... | G02B 6/0085 362/218 |
| 9,204,563 B2* | 12/2015 | Chen | ...................... | A47B 81/06 |
| 9,280,011 B2* | 3/2016 | Ikuta | ........................ | H04N 5/64 |
| 9,323,088 B2* | 4/2016 | Tomomasa | ........ | G02F 1/133308 |
| 9,535,207 B2* | 1/2017 | Youk | .................... | G02B 5/0242 |
| 9,658,390 B2* | 5/2017 | Song | .................... | G02B 6/009 |
| 9,784,999 B2* | 10/2017 | Jun | ................... | G02F 1/133308 |
| 9,885,468 B2* | 2/2018 | Takagi | ................ | F21V 23/0457 |
| 9,915,770 B2* | 3/2018 | Hirayama | ................ | G02B 6/00 |

\* cited by examiner

*Primary Examiner* — Thien M Le
(74) *Attorney, Agent, or Firm* — Polsinelli PC

(57) ABSTRACT

A liquid crystal display is disclosed. The liquid crystal display includes a liquid crystal panel, a light guide plate disposed under a back surface of the liquid crystal panel and having a light incident surface, a light source module including at least one light source disposed opposite the light incident surface and supporting an edge of one side of the liquid crystal panel at a lower part of the liquid crystal panel, and a cover bottom supporting an edge of the other side of the liquid crystal panel at the lower part of the liquid crystal panel and covering at least a portion of the light guide plate and at least a portion of the light source module.

21 Claims, 8 Drawing Sheets

LIQUID CRYSTAL DISPLAY

CROSS REFERENCE TO RELATED APPLICATION

This application claims the priority benefit of Korean Patent Application No. 10-2016-0183951 filed on Dec. 30, 2016, which is incorporated herein by reference in its entirety for all purposes as if fully set forth herein.

BACKGROUND

Field of the Disclosure

The present disclosure relates to a display device, and more particularly, to a thin profile and light weight liquid crystal display capable of efficiently dissipating heat generated in a backlight unit.

Description of the Background

Liquid crystal displays have been applied to portable computers such as notebook PCs, office automation devices, audio/video devices, advertising display devices for indoor or outdoor uses, and so on. The liquid crystal display controls an electric field applied to a liquid crystal layer of a liquid crystal panel and modulates light provided by a backlight unit, thereby displaying an image.

The backlight unit may be classified as an edge type backlight unit or a direct type backlight unit. In the edge type backlight unit, light sources are positioned opposite to a light guide plate, and a plurality of optical sheets is positioned between the liquid crystal panel and the light guide plate. In the edge type backlight unit, the light sources irradiate light onto one side of the light guide plate, and the light guide plate converts a line light source or a point light source into a surface light source and irradiates light onto the liquid crystal panel. In the direct type backlight unit, light sources are positioned under the liquid crystal panel, and the light diffused by a diffuser plate is irradiated onto the liquid crystal panel.

The liquid crystal panel and the backlight unit are assembled together with case members for fixing them to implement a liquid crystal module. The case members may include a panel guide, a cover bottom, a case top, and the like.

Because the conventional liquid crystal display is comprised of a large number of components as described above, it is difficult to design liquid crystal displays of thin profile and light weight. Thus, the conventional liquid crystal displays are difficult to be applied to various fields. Further, when the case members are simply removed to design the liquid crystal display of the thin profile and the light weight, it is difficult to dissipate heat generated in a light source module. Thus, the product may be damaged, or a driving failure may occur.

SUMMARY

The present disclosure provides a liquid crystal display of thin profile and light weight capable of efficiently dissipating heat generated in a backlight unit.

In one aspect of the disclosure, there is provided a liquid crystal display including a liquid crystal panel, a light guide plate disposed under a back surface of the liquid crystal panel and having a light incident surface, a light source module including at least one light source disposed opposite the light incident surface and supporting an edge of one side of the liquid crystal panel at a lower part of the liquid crystal panel, and a cover bottom configured to support an edge of the other side of the liquid crystal panel at the lower part of the liquid crystal panel and cover at least a portion of the light guide plate and at least a portion of the light source module, wherein the cover bottom includes a base portion covering a back surface of the light guide plate, a first guide portion extended from one end of the base portion in a backward direction to cover a portion of an inside surface of the light source module, a second guide portion extended from the first guide portion in a lateral direction to cover a back surface of the light source module and directly contacting the back surface of the light source module, and a third guide portion extended from the second guide portion in a backward direction of the light source module.

In another aspect of the disclosure, a liquid crystal display comprising a liquid crystal panel supported by a cover bottom engaged with a light guide plate and a light source module, the cover bottom includes a base portion covering a back surface of the light guide plate; a first guide portion extended from the base portion and covering a first surface of the light source module; a second guide portion extended from the first guide portion and covering a second surface of the light source module; and a third guide portion extended from the second guide portion and extended away from the light source module.

An end of the third guide portion does not contact the light source module.

The third guide portion includes at least one curved portion.

The liquid crystal display further includes an adhesive member between the inside surface of the light source module and the first guide portion, and the adhesive member is a thermal tape.

The cover bottom further includes a fourth guide portion extended from the other end of the base portion and supporting the edge of the other side of the liquid crystal panel.

The fourth guide portion includes a hemming portion.

The liquid crystal display further includes a stand having an inner space in which the light source module, the first guide portion, the second guide portion, and the third guide portion are accommodated.

The third guide portion directly contacts the stand.

The liquid crystal display further includes a panel driver connected to the liquid crystal panel, and the panel driver is accommodated in the inner space of the stand.

The third guide portion is fixed to the stand through at least one fastening member.

BRIEF DESCRIPTION OF THE DRAWINGS

The accompanying drawings, which are included to provide a further understanding of the disclosure and are incorporated in and constitute a part of this specification, illustrate aspects of the disclosure and together with the description serve to explain the principles of the disclosure.

In the drawings.

DETAILED DESCRIPTION

Reference will now be made in detail to aspects of the disclosure, examples of which are illustrated in the accompanying drawings. Wherever possible, the same reference numbers will be used throughout the drawings to refer to the same or like parts. Detailed descriptions of known arts will be omitted if such may mislead the aspects of the disclosure.

The terms "first", "second", etc. may be used to describe various components, but the components are not limited by such terms. The terms are used only for the purpose of distinguishing one component from other components. For example, a first component may be designated as a second component, and vice versa, without departing from the scope of the present disclosure.

Figure 1:
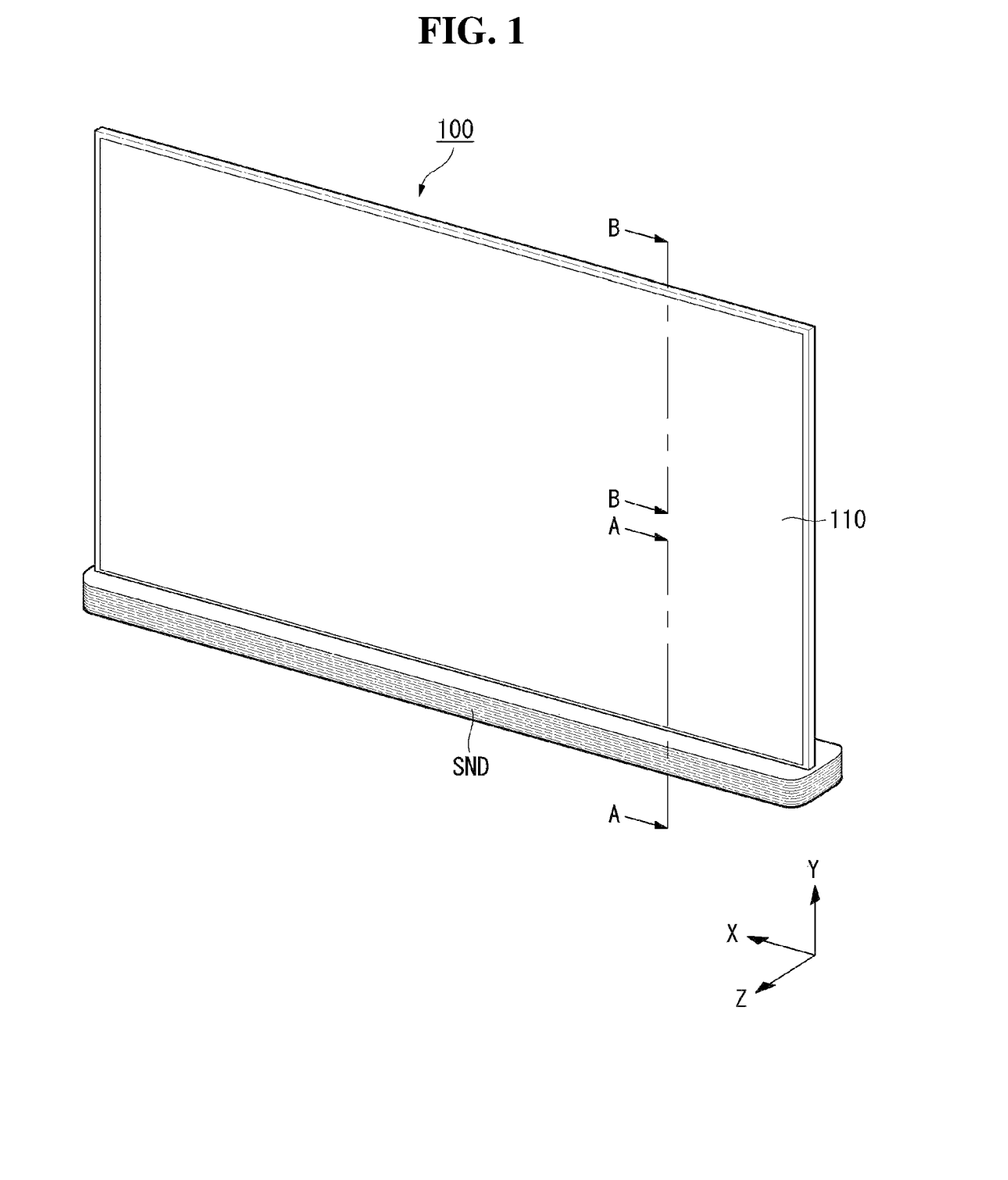
FIG. 1 is a perspective view of a liquid crystal display according to an aspect of the disclosure.
Figure 2:
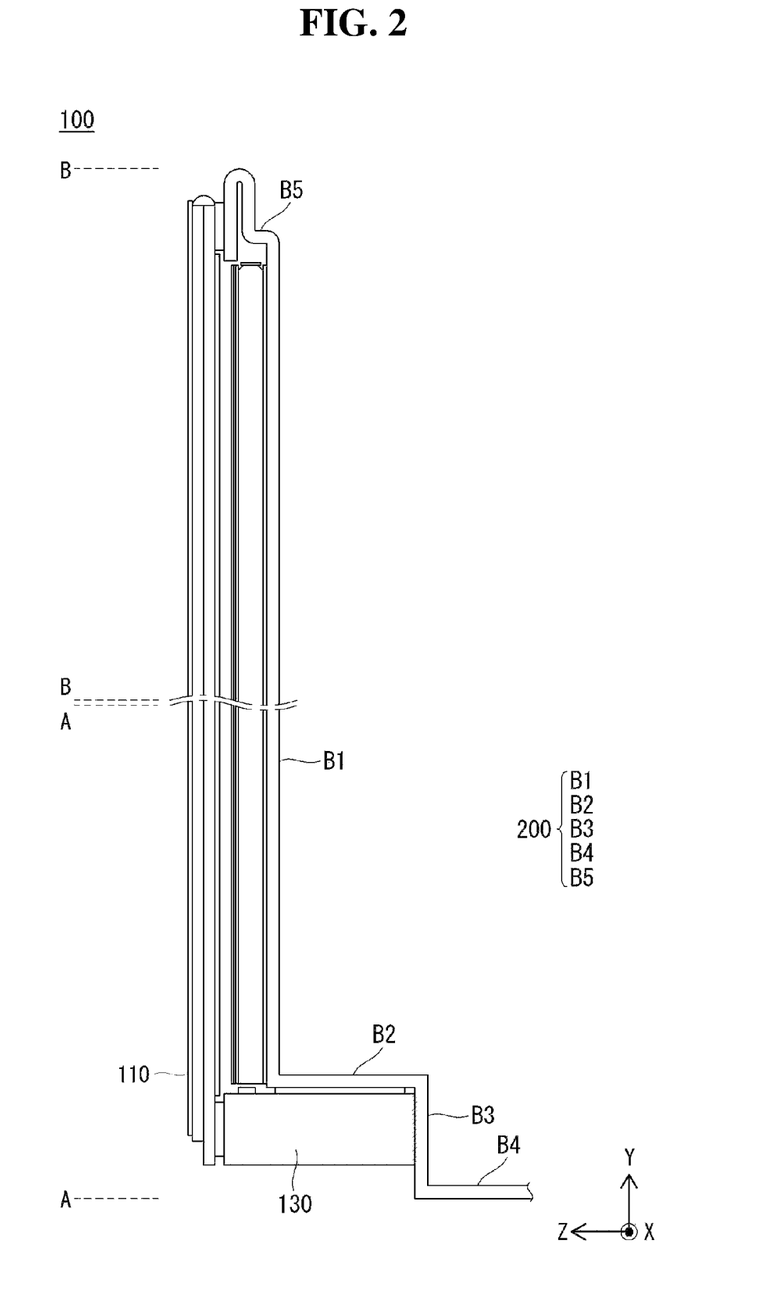
FIG. 2 is a cross-sectional view of a liquid crystal display according to an aspect of the disclosure.
Figure 3:
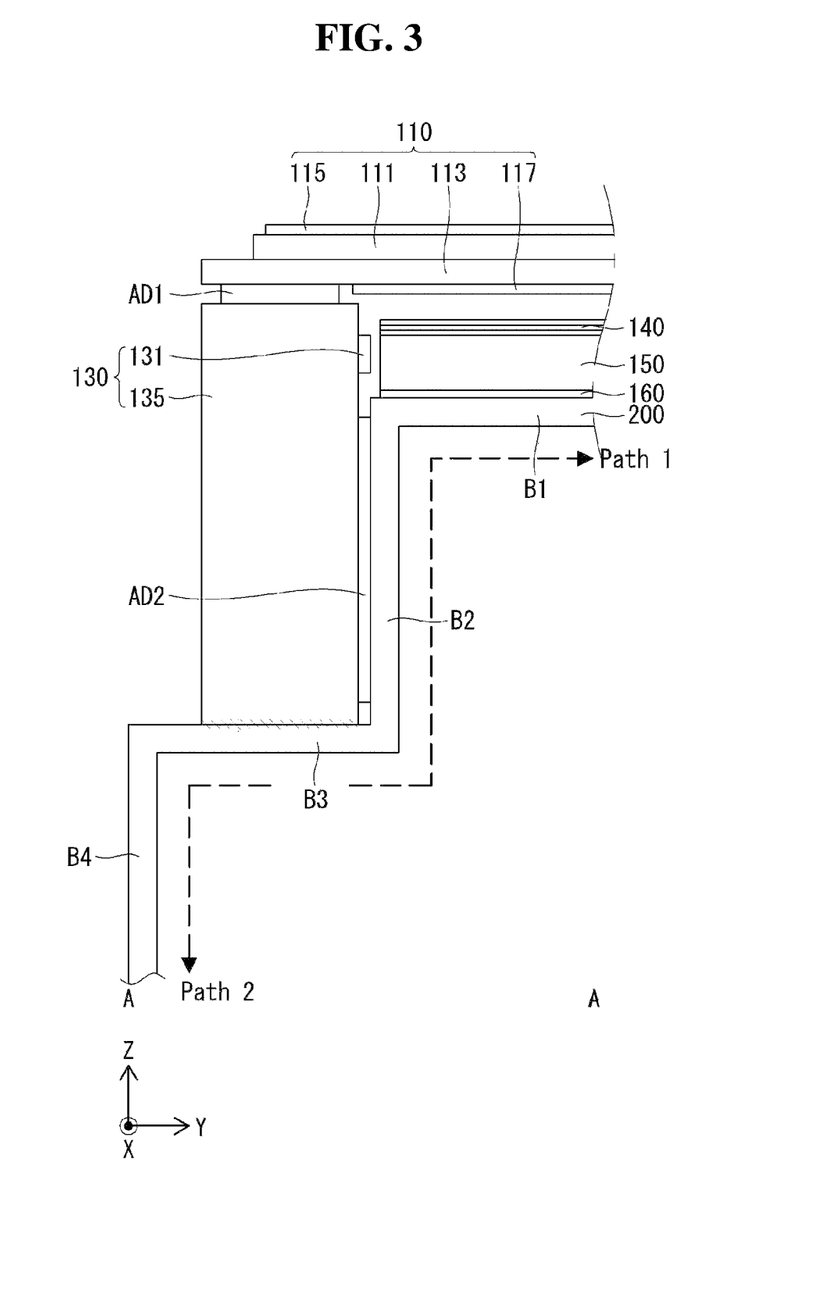
FIG. 3 is a cross-sectional view taken along line A-A of FIG. 1.
Figure 4:
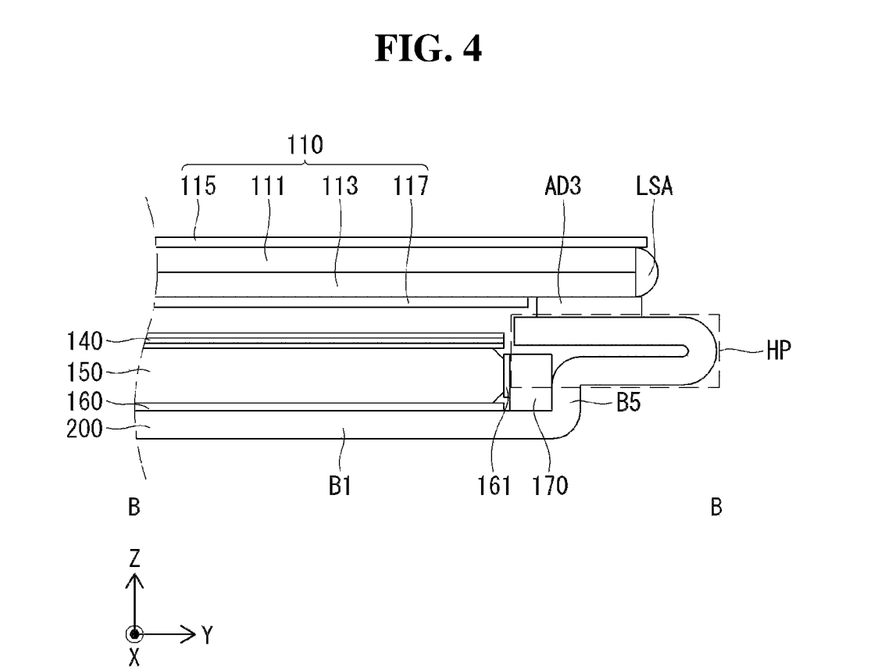
FIG. 4 is a cross-sectional view taken along line B-B of FIG. 1.
Figure 5A:
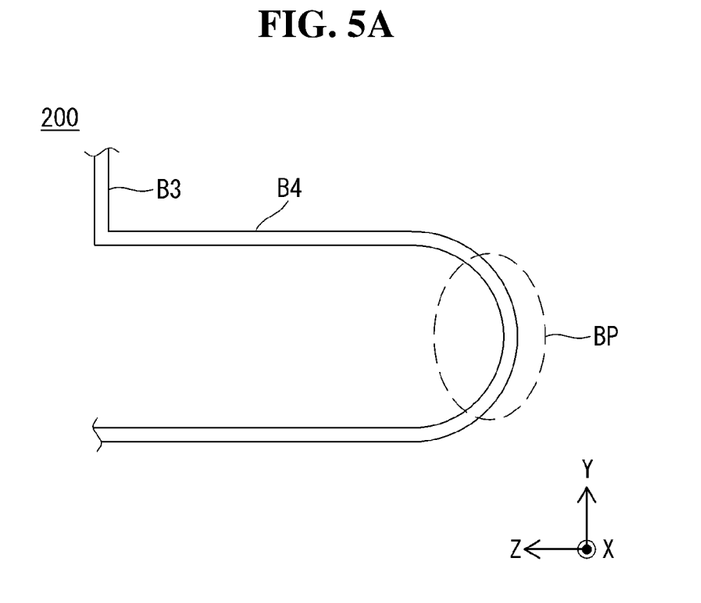
FIGS. 5A and 5B illustrate exemplary shapes of a cover bottom according to an aspect of the disclosure.
Figure 5B:
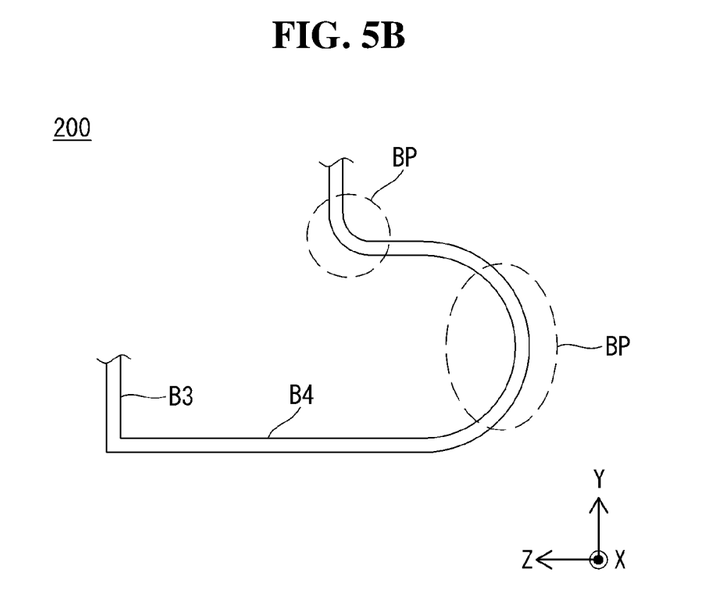
Figure 6:
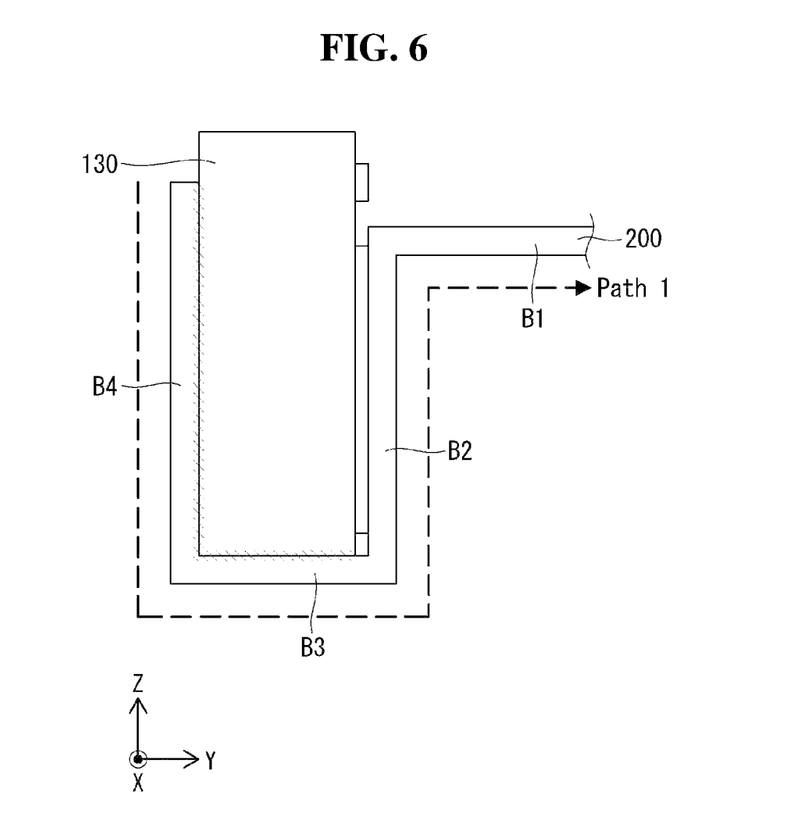
FIG. 6 illustrates an exemplary shape of a cover bottom according to a comparative example.
Figure 7:
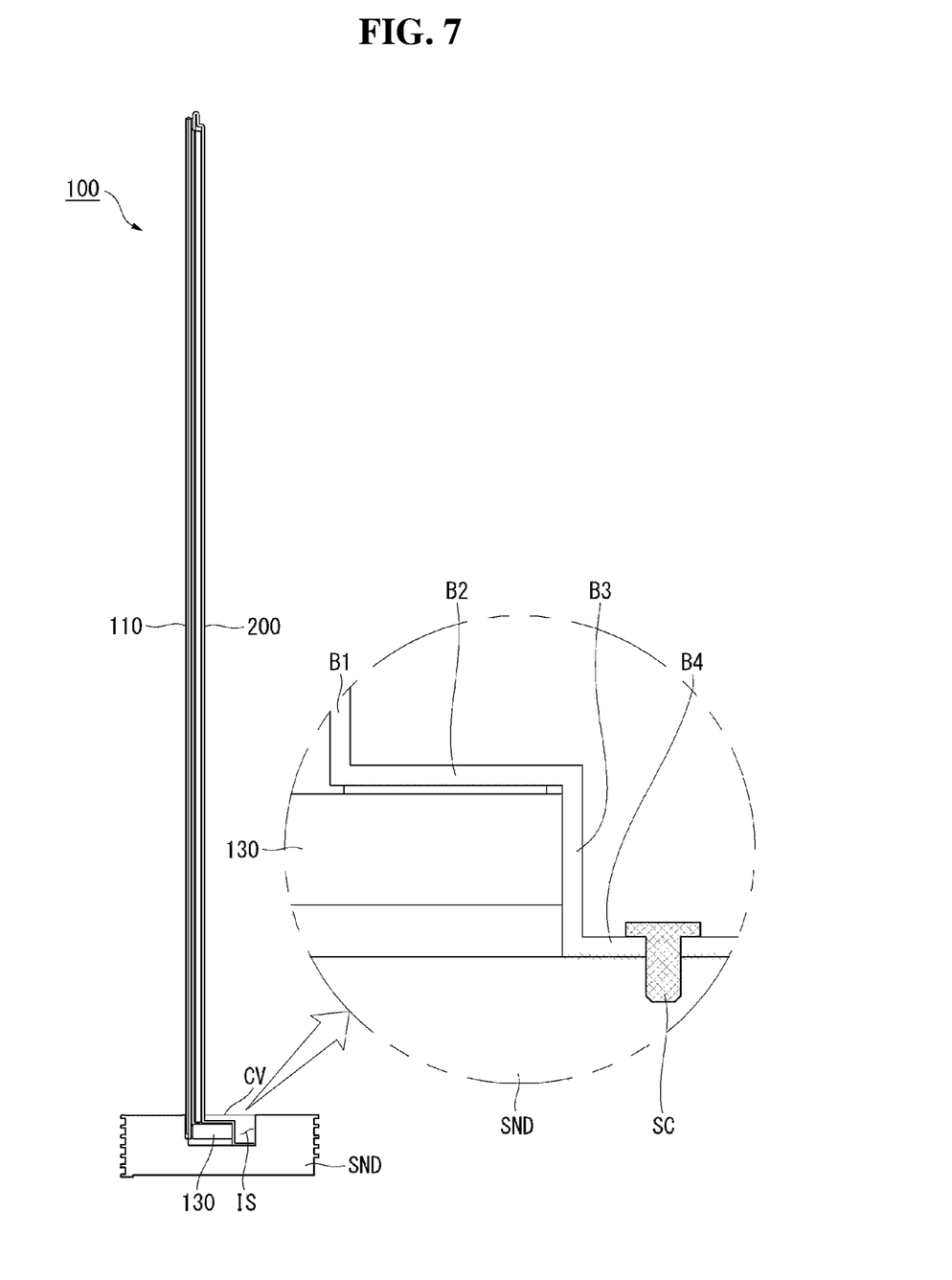
FIG. 7 illustrates a relationship between a liquid crystal display and a stand.

FIG. 1 is a perspective view of a liquid crystal display according to an aspect of the disclosure. FIG. 2 is a cross-sectional view of a liquid crystal display according to an aspect of the disclosure. FIG. 3 is a cross-sectional view taken along line A-A of FIG. 1. FIG. 4 is a cross-sectional view taken along line B-B of FIG. 1. FIGS. 5A and 5B illustrate exemplary shapes of a cover bottom according to an aspect of the disclosure. FIG. 6 illustrates an exemplary shape of a cover bottom according to a comparative example. FIG. 7 illustrates a relationship between a liquid crystal display and a stand.

Referring to FIGS. 1 to 4, a liquid crystal display 100 according to an aspect of the disclosure includes a liquid crystal panel 110 and a backlight unit disposed under the liquid crystal panel 110. The liquid crystal panel 110 includes a second substrate 111, a first substrate 113, and a liquid crystal layer (not shown) interposed between the second substrate 111 and the first substrate 113. The liquid crystal layer may be implemented in at least one of various liquid crystal modes.

The liquid crystal panel 110 displays an image by adjusting a light transmittance of liquid crystals. The liquid crystal panel 110 may include the first substrate 113 and the second substrate 111 that are attached to each other with the liquid crystal layer interposed therebetween, a lower polarizing film 117, and an upper polarizing film 115. The liquid crystal panel 110 drives the liquid crystal layer in accordance with an electric field formed by a data voltage and a common voltage applied to each pixel and adjusts a light transmittance of the liquid crystal layer, thereby displaying a predetermined color image.

A panel driver (not shown) is connected to a pad portion included in the first substrate 113 and transmits a signal for driving each pixel of the liquid crystal panel 110. The panel driver includes a plurality of circuit films (not shown) attached to the pad portion of the liquid crystal panel 110, data driver integrated circuits (not shown) respectively mounted on the plurality of circuit films, and a display printed circuit board (PCB) (not shown) connected to each of the plurality of circuit films. A timing controller (not shown) may be mounted on the display printed circuit board.

The first substrate 113 is often referred to as a thin film transistor array substrate and includes a plurality of pixels (not shown) defined by a plurality of gate lines (not shown) and a plurality of data lines (not shown) intersecting each other. Each pixel may include a thin film transistor (TFT) connected to the gate line and the data line, a pixel electrode connected to the thin film transistor, and a common electrode that is disposed adjacent to the pixel electrode and is supplied with the common voltage. In this instance, the common electrode may be disposed on the second substrate 111 in accordance with a driving manner of the liquid crystal layer. The pad portion connected to the panel driver is provided on one side of the first substrate 113.

The second substrate 111 is often referred to as a color filter array substrate and may be formed to have an area relatively less than the first substrate 113. However, aspects are not limited thereto. The second substrate 111 is attached to the first substrate 113 with the liquid crystal layer interposed therebetween, so that the second substrate 111 overlaps a remaining area excluding the pad portion of the first substrate 113. However, when the liquid crystal panel 110 is implemented as a COT (Color filter On TFT) structure or a TOC (TFT On Color filter) structure, color filters may be formed on the first substrate 113.

The first substrate 113 and the second substrate 111 may be implemented by various configurations that are known to those skilled in the art, depending on driving modes of the liquid crystal layer, for example, a twisted nematic (TN) mode, a vertical alignment (VA) mode, an in-plane switching (IPS) mode, and a fringe field switching (FFS) mode. FIGS. 3 and 4 illustrate that the first substrate 113 is positioned under the second substrate 111, by way of example. However, aspects are not limited thereto. For example, the first substrate 113 may be positioned on the second substrate 111. In the following description, the case where the first substrate 113 is positioned under the second substrate 111 will be described as an example, for convenience of explanation.

The liquid crystal display 100 according to the aspect of the disclosure may further include a sealing member LSA (shown in FIG. 4) covering the sides of the first and second substrates 113 and 111 that are disposed opposite each other, so as to protect the sides of the first and second substrates 113 and 111 and prevent a light leakage. The sealing member LSA may be formed of a sealing resin including an oligomer, a monomer, a photoinitiator, additives, and the like. However, aspects are not limited thereto.

The backlight unit is disposed under the liquid crystal panel 110 and irradiates light onto a back surface of the liquid crystal panel 110. The backlight unit includes a light source module 130, a light guide plate 150, and at least one optical sheet unit 140. Light, that is incident on a light incident surface of the light guide plate 150 from the light source module 130, is converted into light of a surface light source and is emitted to a front surface of the light guide plate 150. The light emitted to the light guide plate 150 is uniformly irradiated onto the back surface of the liquid crystal panel 110 while passing through the optical sheet unit 140 positioned on the light guide plate 150.

The light source module 130 is disposed opposite to the light incident surface of the light guide plate 150 and irradiates light onto the light incident surface provided at one side of the light guide plate 150. The light source module 130 includes a light source 131 and a light source printed circuit board (herein after, "light source PCB") 135. The light source 131 may be mounted on the light source PCB 135. The light source 131 may emit light in response to a driving signal from a backlight driver (not shown). The light source 131 may be a light emitting diode (LED), but is not limited thereto.

The light source module 130 supports an edge of one side of the liquid crystal panel 110 at a lower part (i.e., the lower part corresponding to a light incident portion) of the liquid crystal panel 110. The light incident portion indicates an area of the liquid crystal panel 110 in which the light source module 130 is disposed.

More specifically, the light source PCB 135 is attached to the liquid crystal panel 110 through a first adhesive member AD1 and supports the liquid crystal panel 110. The light source PCB 135 and the liquid crystal panel 110 are fixed and confine and restrict a mutual movement between them. The first adhesive member AD1 may be attached to the first substrate 113 or the lower polarizing film 117 of the liquid crystal panel 110. The first adhesive member AD1 may be one of a double-sided tape, a thermosetting adhesive, a photocurable adhesive, a foam tape, and a foam pad. The first adhesive member AD1 may function to buffer a given external force. The first adhesive member AD1 may include a light shielding material for preventing light from leaking to the edge of the liquid crystal panel 110 and serve as a light shielding member.

The aspect of the disclosure may omit components such as a panel guide (or a guide light), a middle cabinet, and a support side which are included in the conventional liquid crystal panel so as to support the liquid crystal panel. Thus, the aspect of the disclosure can provide the liquid crystal display 100 of thin profile and light weight. Further, the aspect of the disclosure can minimize a bezel area by reducing an area occupied by the components.

The light guide plate 150 is a plate formed of transparent plastic, for example, polymethyl methacrylate (PMMA). The light guide plate 150 may be formed in a flat plate shape (or a wedge shape), so as to have a light incident surface on at least one side of the light guide plate 150. The light guide plate 150 travels light, that is incident on the light incident surface from the light source module 130, toward the liquid crystal panel 110.

The optical sheet unit 140 is disposed on the light guide plate 150. The optical sheet unit 140 may be comprised of multiple layers including one or more diffusion sheets and a prism sheet, but is not limited thereto. For example, the optical sheet unit 140 may be formed of a combination of two or more of a diffusion sheet, a prism sheet, a dual brightness enhancement film, and a lenticular sheet.

The liquid crystal display 100 according to an aspect of the disclosure may further include a reflective sheet 160 under the light guide plate 150. The reflective sheet 160 can reflect light incident from the light guide plate 150 and increase the efficiency of light incident on the liquid crystal panel 110. The reflective sheet 160 may be attached to a cover bottom 200, but is not limited thereto.

The liquid crystal panel 110 and the backlight unit are assembled together with a case member such as the cover bottom 200 to implement a liquid crystal module.

The cover bottom 200 accommodates the backlight unit. The cover bottom 200 may include a material having high thermal conductivity and high rigidity so as to smoothly dissipate heat generated in the light source module 130 to the outside. For example, the cover bottom 200 may be manufactured with a metal plate such as aluminum, aluminum nitride (AlN), electrolytic galvanized iron (EGI), stainless steel (SUS), galvalume steel coil (SGLC), aluminum coated steel (ALCOSTA), and steel plated tin (SPTE). Further, a high conductive material for facilitating the heat transfer may be coated on the metal plate.

The cover bottom 200 includes a base portion B1, a first guide portion B2, a second guide portion B3, a third guide portion B4, and a fourth guide portion B5. In an inner space IS provided by the base portion B1, the first guide portion B2, the second guide portion B3, the third guide portion B4, and the fourth guide portion B5, the backlight unit and the optical sheets are placed in place and aligned. The base portion B1, the first guide portion B2, the second guide portion B3, the third guide portion B4, and the fourth guide portion B5 are formed as one body.

The base portion B1 is disposed to cover a back surface of the light guide plate 150 and supports a back surface of the backlight unit. The reflective sheet 160 may be disposed between the back surface of the light guide plate 150 and the base portion B1.

The first guide portion B2 is extended from one end of the base portion B1 and covers at least a portion of an inside surface of the light source module 130. The inside surface of the light source module 130 indicates a surface facing the light incident surface of the light guide plate 150. One end of the first guide portion B2 is connected to one end of the base portion B1, and the other end is extended along the inside surface of the light source module 130 in a backward direction (e.g., negative Z-axis direction).

The first guide portion B2 is fixed to the inside surface of the light source module 130 through a second adhesive member AD2. The aspect of the disclosure can align the light source module 130 in place by fixing the light source module 130 to the cover bottom 200 through the second adhesive member AD2 and can confine and restrict a movement of the light source module 130. Therefore, the aspect of the disclosure can prevent a reduction in a luminance resulting from the misalignment of the light source module 130 and can also prevent a reduction in the image quality resulting from a reduction in the efficiency of emitted light.

The second adhesive member AD2 may be a double-sided tape, a thermosetting adhesive, a photocurable adhesive, or a foam tape. Alternatively, the second adhesive member AD2 may be a thermal tape. In this instance, the second adhesive member AD2 may serve as a heat dissipation path for dissipating or transferring heat generated in the light source module 130 toward the cover bottom 200.

The second guide portion B3 is extended from the other end of the first guide portion B2 and covers the back surface of the light source module 130. One end of the second guide portion B3 is connected to the other end of the first guide portion B2, and the other end is extended along the back surface of the light source module 130 in a lateral direction (e.g., negative Y-axis direction). The second guide portion B3 directly contacts the back surface of the light source module 130 in a surface-to-surface manner. Therefore, the second guide portion B3 may be used in a heat dissipation path for dissipating the heat generated in the light source module 130. The aspect of the disclosure can effectively dissipate the heat of the light source module 130 and minimize damage to the light source module 130 and its periphery resulting from heat.

The heat generated in the light source module 130 is dissipated to the second guide portion B3 directly contacting the light source module 130 and is transferred along the second guide portion B3, the first guide portion B2, and the base portion B1. Further, the heat generated in the light source module 130 is dissipated to the first guide portion B2 through the light source module 130 and the second adhesive member AD2 made of a thermal tape and is transferred along the first guide portion B2 and the base portion B1. Namely, the second guide portion B3, the first guide portion B2, and the base portion B1 are connected from the light source module 130 to form a first heat dissipation path path1.

The third guide portion B4 is extended from the other end of the second guide portion B3 and is extended in the backward direction. The heat generated in the light source module 130 is dissipated to the second guide portion B3 directly contacting the light source module 130 and is transferred along the second guide portion B3 and the third guide portion B4. Namely, the second guide portion B3 and the third guide portion B4 are connected from the light source module 130 to form a second heat dissipation path path2.

The aspect of the disclosure can dissipate the heat of the light source module 130 through dual heat dissipation paths, which travel in different directions, by forming the cover bottom 200 in a previously set shape. Even if the conventional liquid crystal display had a heat dissipation structure directly contacting a light source module, heat generated in the light source module was dissipated through only one heat dissipation path extended to the outside of the light source module. Therefore, the conventional liquid crystal display had a difficulty in smoothly dissipating the heat generated in the light source module. The aspect of the disclosure transfers the heat generated in the light source module 130 to the second guide portion B3 of the cover bottom 200 directly contacting the light source module 130 and the first guide portion B2 contacting the light source module 130 through the second adhesive member AD2, and transfers the heat of the light source module 130 through the first and second heat dissipation paths path1 and path2, that travel toward the outside of the light source module 130 in different directions. Hence, the aspect of the disclosure can efficiently dissipate the heat of the light source module 130 without using an additional separate heat sink structure for heat dissipation. As a result, the aspect of the disclosure can reduce the manufacturing cost and the manufacturing time because it does not need to have an additional heat dissipation structure, and can improve the manufacturing yield because it does not need to require an additional process for applying the heat dissipation structure.

The other end of the third guide portion B4 may be extended from the other end of the second guide portion B3 to the outside of the light source module 130. The third guide portion B4 does not need to be extended in parallel in the backward direction as shown in FIG. 3. For example, as shown in FIG. 5, the third guide portion B4 may be bent to have at least one curved portion BP (or a bent portion). When the third guide portion B4 has the curved portion BP, an extending direction of the third guide portion B4 may be changed by the curved portion BP. Namely, when the third guide portion B4 has the curved portion BP, the extending direction of the third guide portion B4 extended from the second guide portion B3 in the backward direction may be changed by the curved portion BP. The end of the third guide portion B4 may face toward a forward direction (for example, positive Z-axis direction) or a lateral direction (for example, positive Y-axis direction or negative Y-axis direction). A shape of the third guide portion B4 may be properly selected in accordance with the designer's intention in consideration of the overall shape and the heat dissipation path of the liquid crystal display 100.

In the aspect of the disclosure, the other end of the third guide portion B4 does not contact the light source module 130. On the other hand, as shown in FIG. 6, when the third guide portion B4 is simply configured to contact an outside surface of the light source module 130, the light source module 130 has only one heat dissipation path formed by connecting the third guide portion B4, the second guide portion B3, the first guide portion B2, and the base portion B1. Therefore, it is difficult to efficiently dissipate the heat generated in the light source module 130. However, in the aspect of the disclosure, the end of the third guide portion B4 does not contact the light source module 130 and is extended to the outside of the light source module 130, and thus the dual heat dissipation paths can be formed.

The fourth guide portion B5 is extended from the other end of the base portion B1 and covers the side of the light guide plate 150. The fourth guide portion B5 is provided in a light non-incident portion. The light non-incident portion indicates an area in which the light source module 130 is not disposed, unlike the light incident portion. One end of the fourth guide portion B5 is connected to the other end of the base portion B1, and the other end is extended in the forward direction (for example, the positive Z-axis direction) along the side of the light guide plate 150. The fourth guide portion B5 is attached to the liquid crystal panel 110 through a third adhesive member AD3 and supports the edge of the liquid crystal panel 110 at the lower part of the liquid crystal panel 110. The fourth guide portion B5 and the liquid crystal panel 110 are fixed and confine and restrict a mutual movement between them. The third adhesive member AD3 may be attached to the first substrate 113 or the lower polarizing film 117 of the liquid crystal panel 110. The third adhesive member AD3 may be one of a double-sided tape, a thermosetting adhesive, a photocurable adhesive, a foam tape, and a foam pad. The third adhesive member AD3 may function to buffer a given external force. The third adhesive member AD3 may include a light shielding material for preventing light from leaking to the edge of the liquid crystal panel 110 and serve as a light shielding member.

In the aspect of the disclosure, the cover bottom 200 directly contacting the light source module 130 can dissipate the heat generated in the light source module 130 and align the light source module 130. Thus, the aspect of the disclosure can remove a separate component such as a light source housing required for the heat dissipation and the alignment of the conventional light source module. Further, as described above, because the aspect of the disclosure can fix and support the liquid crystal panel 110 in place using the cover bottom 200, the aspect of the disclosure can remove the case member such as the panel guide. Namely, the cover bottom 200 according to the aspect of the disclosure is configured to have a predetermined shape and can fix and support the backlight unit and the liquid crystal panel 110, thereby efficiently dissipating heat generated in the backlight unit. Hence, the aspect of the disclosure can provide the liquid crystal display 100 of thinner profile and lighter weight than the related art by including the cover bottom 200 performing a complex function.

A side reflective sheet 161 may be further provided between the light guide plate 150 and the fourth guide portion B5. The side reflective sheet 161 is disposed on the side of the light guide plate 150 and again reflects light incident from the light guide plate 150 onto the light guide plate 150, thereby minimizing a loss of light emitted to the side of the light guide plate 150.

A stopper 170 may be further provided between the light guide plate 150 and the fourth guide portion B5. The stopper 170 may confine and restrict a movement of the light guide plate 150 and fix the light guide plate 150 in place. The stopper 170 can prevent a movement of the light guide plate 150 resulting from external factors such as change in temperature, change in humidity, an external impact, and a vibration. The stopper 170 may be a buffer member. For example, the stopper 170 may include one of silicone and rubber.

The fourth guide portion B5 may include a hemming portion HP. Namely, the other end of the fourth guide portion B5 may be extended toward the inside of the cover bottom 200, in which the backlight unit is accommodated, due to the hemming portion HP. Hence, the fourth guide portion B5 can prevent a corrosion that may occur when the other end of the fourth guide portion B5 is exposed to the outside. As a result, the reliability of the product can be improved, and an appearance can be easily implemented.

Referring to FIG. 7, the liquid crystal display 100 according to the aspect of the disclosure may further include a stand SND capable of stably supporting the liquid crystal display 100. The inner space IS, in which at least a portion of the liquid crystal display 100 is accommodated, is provided inside the stand SND. At least a portion of the liquid crystal display 100 may be introduced into the inner space IS through an opened side of the inner space IS.

A portion of the liquid crystal display 100 accommodated in the inner space IS of the stand SND may be a light incident portion in which the light source module 130 is positioned.

For example, the light source module 130, the first guide portion B2, the second guide portion B3, and the third guide portion B4 may be accommodated in the inner space IS of the stand SND. As another example, the panel driver (not shown) may be accommodated in the inner space IS of the stand SND. Namely, the pad portion (not shown) provided on the first substrate 113 and the panel driver connected to the pad portion may be disposed in the light incident portion and may be accommodated in the inner space IS of the stand SND. The aspect of the disclosure can expose only a thin portion of the liquid crystal display 100 to the outside of the stand SND by accommodating the light source module 130 occupying a relatively large space and the panel driver in the inner space IS of the stand SND.

A portion of the liquid crystal panel 110 accommodated in the inner space IS of the stand SND may be a non-display area on which an image is not displayed. Hence, the liquid crystal display 100 according to the aspect of the disclosure can minimize the bezel area perceived by a user.

The third guide portion B4 of the cover bottom 200 may be extended to be accommodated in the inner space IS of the stand SND and directly contact one side of the stand SND. The aspect of the disclosure can secure the heat dissipating path connecting from the cover bottom 200 to the stand SND by extending the third guide portion B4 of the cover bottom 200 and bringing the third guide portion B4 into contact with the stand SND. The aspect of the disclosure can sufficiently secure the heat dissipating path connecting from the cover bottom 200 to the stand SND without a separate heat dissipation means. Thus, the aspect of the disclosure can prevent damage to the product due to heat and provide the liquid crystal display device 100 of thin profile and light weight while securing the reliability of the product.

The cover bottom 200 and the stand SND may be fixed through at least one fastening member SC. For example, the third guide portion B4 of the cover bottom 200 may be fixed to the stand SND through at least one fastening member SC. The fastening member SC may be a screw, but is not limited thereto.

The stand SND may further include a cover CV capable of shielding the components accommodated in the inner space IS of the stand SND. The cover CV may be configured to open and close an opened side of the inner space IS.

Although aspects have been described with reference to a number of illustrative aspects thereof, it should be understood that numerous other modifications and aspects can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display, comprising:
a liquid crystal panel;
a light guide plate disposed on a back surface of the liquid crystal panel and having a light incident surface;
a light source module comprising at least one light source disposed opposite to the light incident surface and supporting an edge of one side of the liquid crystal panel; and
a cover bottom configured to support an edge of the other side of the liquid crystal panel at the lower part of the liquid crystal panel and cover at least a portion of the light guide plate and at least a portion of the light source module, wherein the cover bottom includes,
a base portion covering a back surface of the light guide plate,
a first guide portion extended from one end of the base portion to cover a portion of an inside surface of the light source module,
a second guide portion extended from the first guide portion to cover a back surface of the light source module and directly contacting the back surface of the light source module, and
a third guide portion extended from the second guide portion and extended away from the light source module.

2. The liquid crystal display of claim 1, wherein the third guide portion has one end not directly contacting the light source module.

3. The liquid crystal display of claim 1, wherein the third guide portion includes at least one curved portion.

4. The liquid crystal display of claim 1, further comprising an adhesive member between the inside surface of the light source module and the first guide portion.

5. The liquid crystal display of claim 1, wherein the cover bottom comprises a fourth guide portion extended from the other end of the base portion and supporting the edge of the other side of the liquid crystal panel.

6. The liquid crystal display of claim 5, wherein the fourth guide portion includes a hemming portion.

7. The liquid crystal display of claim 1, further comprising a stand having an inner space where the light source module, the first guide portion, the second guide portion, and the third guide portion are accommodated.

8. The liquid crystal display of claim 7, wherein the third guide portion directly contacts the stand.

9. The liquid crystal display of claim 7, further comprising a panel driver connected to the liquid crystal panel and accommodated in the inner space of the stand.

10. The liquid crystal display of claim 7, wherein the third guide portion is fixed to the stand through at least one fastening member.

11. The liquid crystal display of claim 1, further comprising a stand having an inner space where the light source module and the first, second and third guide portions are accommodated.

12. The liquid crystal display of claim 11, wherein the third guide portion directly contacts the stand.

13. The liquid crystal display of claim 11, further comprising a panel driver connected to the liquid crystal panel and is accommodated in the inner space of the stand.

14. The liquid crystal display of claim 11, wherein the third guide portion is fixed to the stand through at least one fastening member.

15. The liquid crystal display of claim 1, further comprising a first adhesive member is interposed between the liquid crystal panel and the light source module, and fixes the light source module to the liquid crystal panel.

16. A liquid crystal display comprising a liquid crystal panel supported by a cover bottom engaged with a light guide plate and a light source module, comprising:
- a base portion covering a back surface of the light guide plate;
- a first guide portion extended from the base portion and covering a first surface of the light source module;
- a second guide portion extended from the first guide portion and covering a second surface of the light source module and directly contacting the second surface of the light source module; and
- a third guide portion extended from the second guide portion and extended away from the light source module.

17. The liquid crystal display of claim 16, wherein the third guide portion has one end not directly contact the light source module.

18. The liquid crystal display of claim 16, wherein the third guide portion includes at least one curved portion.

19. The liquid crystal display of claim 16, further comprising an adhesive member between the first guide portion and the first surface of the light source module.

20. The liquid crystal display of claim 16, further comprising a fourth guide portion connected to the base portion and extended away from the first guide portion and supporting an edge side of the liquid crystal panel.

21. The liquid crystal display of claim 20, wherein the fourth guide portion includes a hemming portion.

* * * * *